US010811967B2

(12) United States Patent
Veeramreddi

(10) Patent No.: US 10,811,967 B2
(45) Date of Patent: Oct. 20, 2020

(54) FAST MODE TRANSITIONS IN A POWER CONVERTER

(71) Applicant: TEXAS INSTRUMENTS INCORPORATED, Dallas, TX (US)

(72) Inventor: Srinivas Venkata Veeramreddi, Hyderabad (IN)

(73) Assignee: Texas Instruments Incorporated, Dallas, TX (US)

( * ) Notice: Subject to any disclaimer, the term of this patent is extended or adjusted under 35 U.S.C. 154(b) by 98 days.

(21) Appl. No.: 16/118,759

(22) Filed: Aug. 31, 2018

(65) Prior Publication Data

US 2019/0089247 A1   Mar. 21, 2019

Related U.S. Application Data

(63) Continuation of application No. 15/597,400, filed on May 17, 2017, now Pat. No. 10,069,419, which is a continuation of application No. 14/588,111, filed on Dec. 31, 2014, now Pat. No. 9,685,863.

(51) Int. Cl.
*H02M 3/158* (2006.01)
*H02M 1/00* (2006.01)

(52) U.S. Cl.
CPC ...... *H02M 3/158* (2013.01); *H02M 2001/008* (2013.01); *H02M 2001/0032* (2013.01); *Y02B 70/16* (2013.01)

(58) Field of Classification Search
CPC ......... H02M 3/158; H02M 2001/0032; H02M 2001/008; Y02B 70/16
See application file for complete search history.

(56) References Cited

U.S. PATENT DOCUMENTS

| 7,148,670 | B2 | 12/2006 | Inn et al. |
| 7,268,448 | B2 | 9/2007 | Hasegawa |
| 9,225,245 | B2 | 12/2015 | Miyamae |
| 9,685,863 | B2* | 6/2017 | Veeramreddi ......... H02M 3/158 |
| 10,069,419 | B2* | 9/2018 | Veeramreddi ......... H02M 3/158 |
| 2008/0231115 | A1* | 9/2008 | Cho ........................ H02J 1/08 |
| | | | 307/41 |
| 2012/0200271 | A1 | 8/2012 | Henzler |
| 2012/0223693 | A1 | 9/2012 | Tang |

(Continued)

FOREIGN PATENT DOCUMENTS

| CN | 101667019 A | 3/2010 |
| WO | 2007076702 | 7/2007 |

*Primary Examiner* — Jue Zhang
(74) *Attorney, Agent, or Firm* — Brian D. Graham; Charles A. Brill; Frank D. Cimino

(57) ABSTRACT

Disclosed embodiments of a power converter include a power output stage for generating a first voltage output and an auxiliary power output stage for generating a second voltage output. The power converter further includes a pulse frequency modulation (PFM) controller for controlling the power output stage in response to the first voltage output generated by the power output stage during a first period of time in which the power output stage operates in a PFM mode, and a pulse width modulation (PWM) controller for controlling the auxiliary power output stage in response to the second voltage output generated by the auxiliary power output stage during a second period of time. At least a portion of the first period of time is concurrent with the second period of time.

18 Claims, 5 Drawing Sheets

(56) References Cited

U.S. PATENT DOCUMENTS

| | | |
|---|---|---|
| 2013/0027009 A1 | 1/2013 | Tang |
| 2013/0082668 A1* | 4/2013 | Tseng .................... H02M 3/158 323/267 |
| 2013/0093407 A1 | 4/2013 | Heo et al. |
| 2014/0167711 A1 | 6/2014 | Thenus et al. |

* cited by examiner

FAST MODE TRANSITIONS IN A POWER CONVERTER

CROSS-REFERENCE TO RELATED APPLICATION(S)

The present application is a continuation of and claims priority to U.S. patent application Ser. No. 15/597,400, filed on May 17, 2017 and now U.S. Pat. No. 10,069,419, which is a continuation of and claims priority to U.S. patent application Ser. No. 14/588,111 filed on Dec. 31, 2014 and now U.S. Pat. No. 9,685,863, which are incorporated herein by reference.

BACKGROUND

Many communication systems, which often include wireless devices that both transmit and receive, operate in accordance with data transmission standards. Often, the data transmission standards specify relatively strict spectral mask requirements, which specify reduced amounts of noise, such as electromagnetic interference (EMI), during data transmission. The transmitter of such communication devices includes a power amplifier (PA) that is operable to transmit data in accordance with a data transmission standard. The PA typically receives power from a power converter, such as a DC-DC (direct current-to-direct current) converter. The power converter typically operates in a pulse-width modulation (PWM) mode during transmission in order to increase EMI compliance. The operating load on the power converter typically varies during operation of the communication device. For example, the operating load typically is relatively low while the system is in receive mode, during which time of operation the PA (and the power converter) is optionally turned off to conserve power. The power converter can be turned off because is normally inefficient to operate the power converter in a PWM mode during such times of low operating loads.

However, turning the power converter on again entails a relatively long wakeup time (e.g., on the order of hundreds of microseconds) during which the transmitter is not available for transmitting. The power converter can be switched to run in a relatively more efficient pulse-frequency modulation (PFM) mode during such low-load periods, but during the transition back to a PWM mode for a higher-load transmission period typically requires a settling time on the order of a few tens of microseconds. Such settling times exceed the settling requirements of some applications.

SUMMARY

The problems noted above can be solved in a fast mode-transitioning power converter. For example, the disclosed power converter includes a PFM controller, a PWM controller, and an auxiliary voltage output stage. The PFM controller controls a power output stage in a PFM mode in response to a power stage voltage output generated by the power output stage during a first period of time in which the power output stage is operating in the PFM mode. The PWM controller controls the power output stage in a PWM mode in response to a power stage voltage output generated by the power output stage during a second period of time in which the power output stage is operating in the PWM mode. The auxiliary voltage output stage generates an auxiliary voltage during a third period of time, where the PWM controller controls the auxiliary voltage during the third period of time.

This Summary is submitted with the understanding that it is not be used to interpret or limit the scope or meaning of the claims. Further, the Summary is not intended to identify key features or essential features of the claimed subject matter, nor is it intended to be used as an aid in determining the scope of the claimed subject matter.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be example of that embodiment, and not intended to intimate that the scope of the disclosure, including the claims, is limited to that embodiment.

Certain terms are used throughout the following description—and claims—to refer to particular system components. As one skilled in the art will appreciate, various names may be used to refer to a component or system. Accordingly, distinctions are not necessarily made herein between components that differ in name but not function. Further, a system can be a sub-system of yet another system. In the following discussion and in the claims, the terms "including" and "comprising" are used in an open-ended fashion, and accordingly are to be interpreted to mean "including, but not limited to . . . ." Also, the terms "coupled to" or "couples with" (and the like) are intended to describe either an indirect or direct electrical connection. Thus, if a first device couples to a second device, that connection can be made through a direct electrical connection, or through an indirect electrical connection via other devices and connections. The term "portion" can mean an entire portion or a portion that is less than the entire portion. The term "calibration" can include the meaning of the word "test." The term "input" can mean either a source or a drain (or even a control input such as a gate where context indicates) of a PMOS (positive-type metal oxide semiconductor) or NMOS (negative-type metal oxide semiconductor) transistor. The term "pulse" can mean a portion of waveforms such as "squarewave" or "sawtooth" waveforms.

Figure 1:
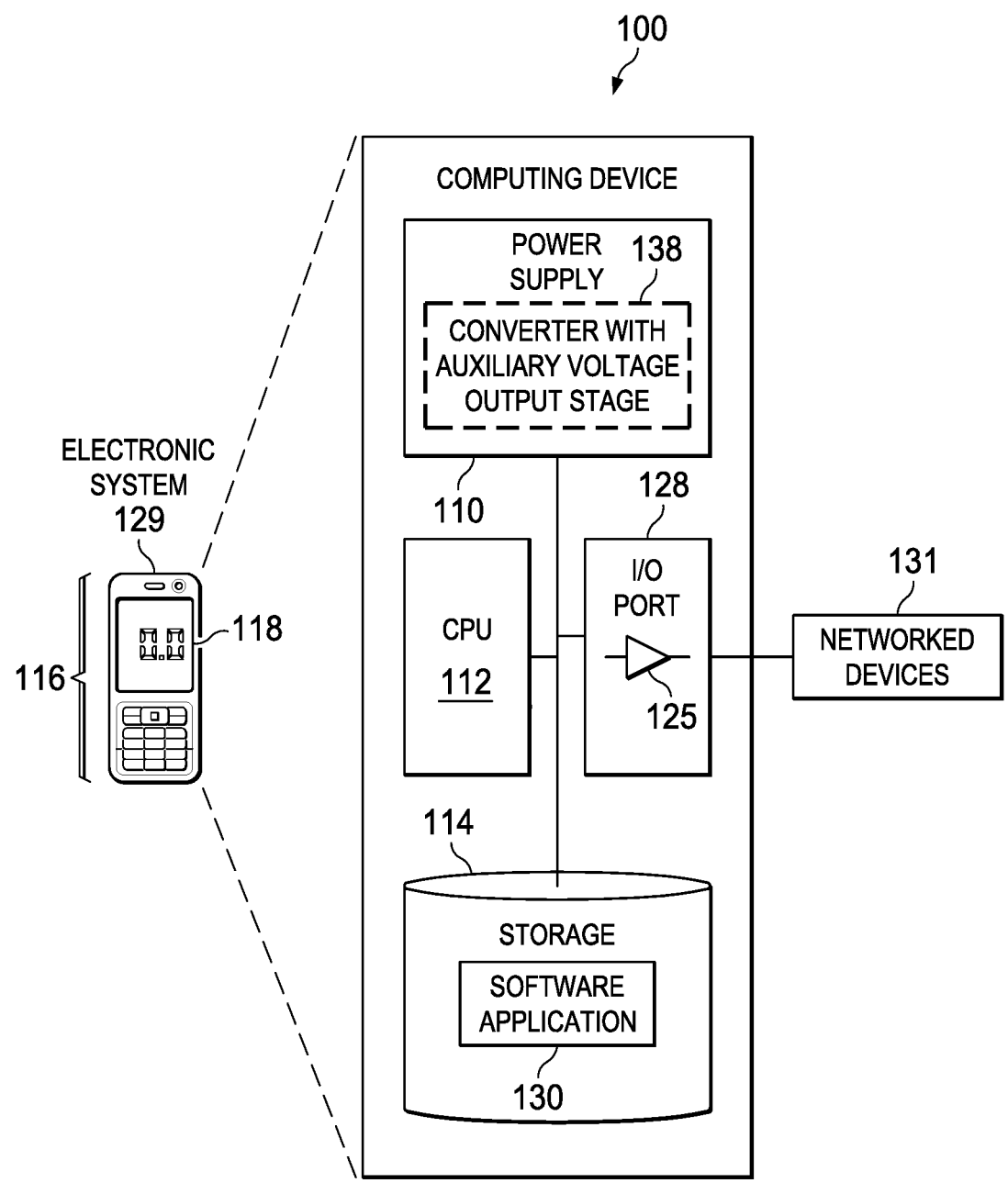
FIG. 1 shows an illustrative electronic device in accordance with example embodiments of the disclosure.

FIG. 1 shows an illustrative computing device 100 in accordance with embodiments of the disclosure. For example, the computing device 100 is, or is incorporated into, or is coupled (e.g. connected) to an electronic system 129, such as a computer, electronics control "box" or display, communications equipment (including transmitters or receivers), or any type of electronic system operable to process information. In various embodiments, the electronics system 129 is included in a telecommunications system (or a portion thereof such as a transmitter-receiver or transceiver), and in more particular embodiments, a wireless and/or low-power transceiver.

In various embodiments, the computing device 100 comprises a megacell or a system-on-chip (SoC) which includes control logic such as a CPU 112 (Central Processing Unit), a storage 114 (e.g., random access memory (RAM)) and a power supply 110. The CPU 112 can be, for example, a CISC-type (Complex Instruction Set Computer) CPU, RISC-type CPU (Reduced Instruction Set Computer), MCU-type (Microcontroller Unit), or a digital signal processor (DSP). The storage 114 (which can be memory such as on-processor cache, off-processor cache, RAM, flash memory, or disk storage) stores one or more software applications 130 (e.g., embedded applications) that, when executed by the CPU 112, perform any suitable function associated with the computing device 100.

The CPU 112 comprises memory and logic that store information frequently accessed from the storage 114. The computing device 100 is often controlled by a user using a UI (user interface) 116, which provides output to and receives input from the user during the execution of the software application 130. The output is provided using the display 118, indicator lights, a speaker, vibrations, and the like. The input is received using audio and/or video inputs (using, for example, voice or image recognition), and electrical and/or mechanical devices such as keypads, switches, proximity detectors, gyros, accelerometers, and the like.

The CPU 112 and power supply 110 are coupled to I/O (Input-Output) port 128, which provides an interface that is configured to receive input from (and/or provide output to) networked devices 131. The CPU 112 and power supply 110 are also coupled to the power amplifier (PA) 125, which provides power to the electronic system 129. Although the PA 125 is illustrated as being included in the I/O port 128, in various embodiments the PA 125 is optionally physically separated from the I/O port 128. The networked devices 131 can include any device (including test equipment) capable of point-to-point and/or networked communications with the computing device 100. The computing device 100 is often coupled to peripherals and/or computing devices, including tangible, non-transitory media (such as flash memory) and/or cabled or wireless media. These and other input and output devices are selectively coupled to the computing device 100 by external devices using wireless or cabled connections. The storage 114 is accessible, for example, by the networked devices 131. The CPU 112, storage 114, and power supply 110 are also optionally coupled to an external power supply (not shown), which is configured to receive power from a power source (such as a battery, solar cell, "live" power cord, inductive field, fuel cell, capacitor, and the like).

The power supply 110 comprises power generating and control components for generating power to enable the computing device 100 to execute the software application 130. For example, the power supply 110 provides one or more power switches, each of which can be independently controlled, that supply power at various voltages to various components of the computing device 100. The power supply 110 is optionally in the same physical assembly as computing device 100, or is coupled to computing device 100. The computing device 100 optionally operates in various power-saving modes wherein individual voltages are supplied (and/or turned off) in accordance with a selected power-saving mode and the various components arranged within a specific power domain.

The power supply 110 is in various embodiments a switched-mode power supply (e.g., "converter") that alternately stores and outputs energy. Such converters typically receive either a DC (direct current) or rectified AC (alternating current) voltage as an input voltage. Energy derived from the input voltage is temporarily stored in energy storage devices (such as an inductors and capacitors) during each switching cycle. A power switch in the converter is actuated (e.g., closed for a "turned on" state or opened for a "turned off" state) to control the amount of energy that is output. A filter is normally used to reduce ripple in the output DC voltage and current. Depending on the topology selected for the converter, the output DC voltage can be higher or lower than the input voltages. The output DC voltage can also be inverted with respect to the input voltage.

Switching converters typically operate in either a discontinuous mode or a continuous mode. In the discontinuous mode, converters completely de-energize the energy storage devices before the end of every switching cycle. Accordingly, no current flows in the energy storage devices at the start of every switching cycle in the discontinuous mode. In the continuous mode, converters normally do not completely de-energize the energy storage devices before the end of every switching cycle. Accordingly, the current in the energy storage devices operating in a continuous mode normally does not reach a point where current does not flow in the energy storage devices.

The discontinuous inductor current conduction mode (DCM) is a power mode that is used to improve light-load efficiency in switching power converters. Because many computing devices 100 typically operate in applications that present electrical loads that are in the light-to-medium load current range, the light-load efficiency of voltage regulators has a substantial impact of the power efficiency of a system.

The output of a converter is determined in part by the duty ratio. The duty ratio is the time period in which the switch is "on" divided by the time period of the switching cycle (e.g., in accordance with the equation D=Ton/Tp). The switching cycle time period is typically equal to the time period in which the switch is "on" plus the time period in which the switch is "off" and plus any time period in which the switch is "idle" (where Tp=Ton+Toff+Tidle). The output voltage of the buck converter in CCM (continuous conduction mode) is theoretically equal to the input voltage multiplied by the duty ratio (e.g., in accordance with the equation: Vout=Vin*D). The ranges of values of Ton and Toff are typically selected during design time (e.g., to achieve an optimum efficiency from a given technology process node in order to meet mask specifications of wireless standards, and the like).

The disclosed power supply 110 includes a fast mode-transitioning power converter 138, which in turn includes an auxiliary voltage output stage. The fast mode-transitioning power converter is operable to provide a relatively low-power PWM mode of operation ("auxiliary PWM") for a PA power converter, having very low quiescent (no-load) currents, and which can be operated in parallel to the PFM mode. The auxiliary PWM mode can be introduced whenever the converter needs to provide a very low load current, and is operable to provide a rapid transition to the PWM mode of operation to meet application system demands. Accordingly, the fast mode-transitioning power converter provides a rapid settling time (e.g., which is often required by WLAN standards) while allowing the power converter to operate as much as possible in PFM mode (e.g., which helps minimize power consumption by the power converter).

In one example, the power supply 110 is a DC-DC converter operable to operate in a discontinuous conduction mode (DCM). As introduced above, the power supply 110 includes a fast mode-transitioning power converter 138. Although the fast mode-transitioning power converter 138 is illustrated as being included in the power supply 110 or as a single (e.g., logical) unit, various portions of the fast mode-transitioning power converter 138 are optionally included in the same module (e.g., as formed by a die as produced in semiconductor manufacturing) or in different modules.

The fast mode-transitioning power converter 138 is operable to provide a relatively low-power PWM mode of operation ("auxiliary PWM"). The auxiliary PWM mode is typically operated in parallel to (e.g., at the same time as operating in) operation of a PFM mode. The fast mode-transitioning power converter 138 is operable to provide rapid transitions between PFM and PWM modes. In various embodiments, the fast mode-transitioning power converter 138 is a buck converter, a buck-boost converter, or the like. In example embodiments, the fast mode-transitioning power converter 138 comprises an auxiliary voltage output stage (e.g., 270 of FIG. 2) that includes power switches (such as FET switches) and passive components selected in accordance with a target application.

Figure 2:
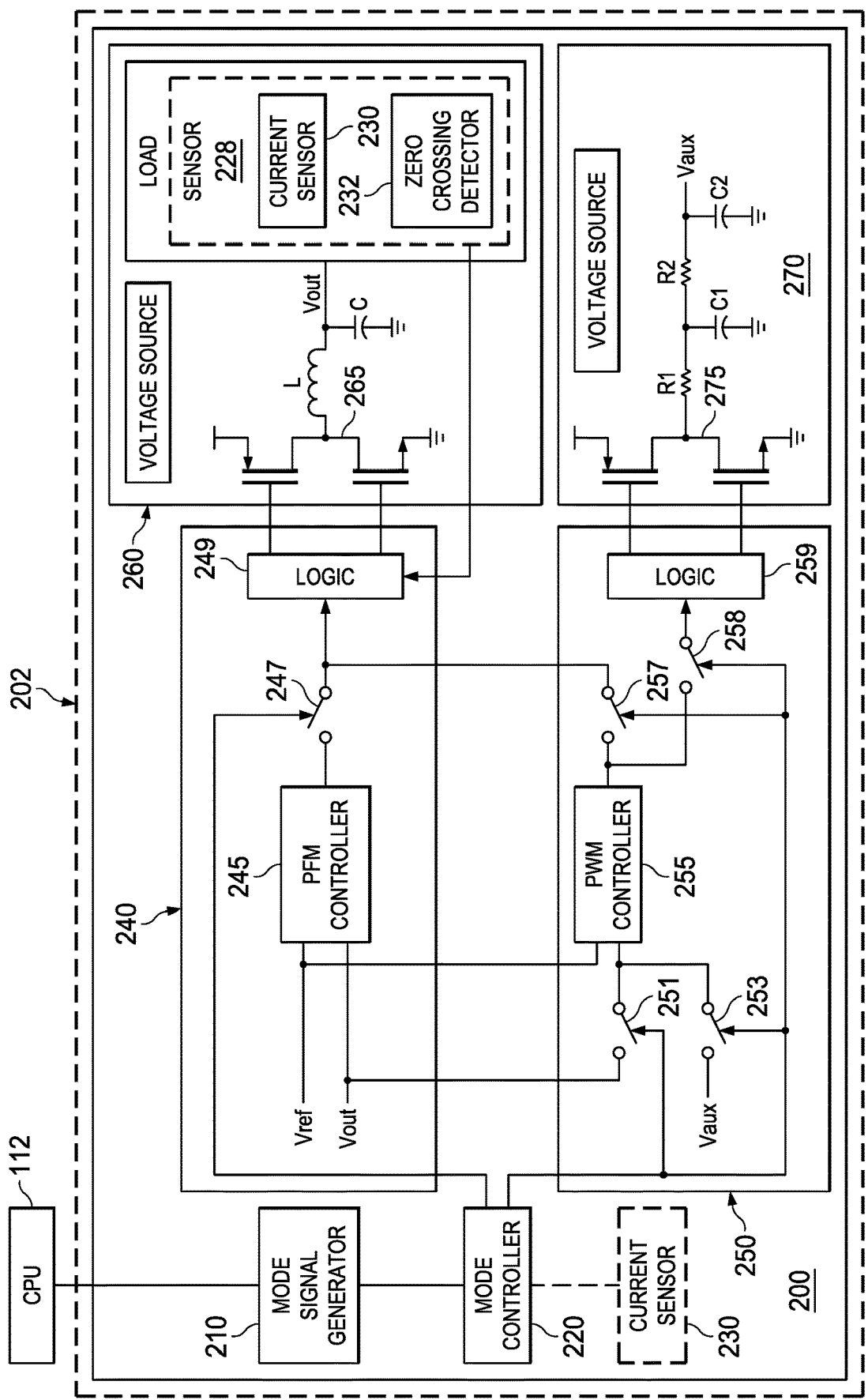
FIG. 2 is a schematic diagram illustrating a fast mode-transitioning power converter in accordance with example embodiments of the disclosure.

FIG. 2 is a schematic diagram illustrating a fast mode-transitioning power converter 200 in accordance with example embodiments of the disclosure. The fast mode-transitioning power converter 200 includes a particular embodiment of the fast mode-transitioning power converter 138 of FIG. 1, and is optionally formed (e.g., in whole or in part) on a substrate 202. Generally described, the fast mode-transitioning power converter 200 includes a mode signal generator 210, a mode controller 220, a sensor 228, a PFM controller 240, a PWM controller 250, a power output stage 260 (e.g., operable to generate a voltage output Vout), and an auxiliary voltage output stage 270 (e.g., operable to generate an auxiliary output voltage Vaux.

The mode signal generator 210 generates signals that are operable to select operation in a PFM mode or in a PWM mode voltage output. The mode signal generator can be operated in response to signals from a processor such as a CPU 112 (as illustrated in FIG. 1). In various embodiments, the processor sends signals to the mode signal generator 210 in response to communications network protocols, such as network interface protocols that determine whether the electronic system 129 is in a receiving mode or a transmitting mode. For example, the mode signal generator 210 selects operating modes of the fast mode-transitioning power converter 200 in response to a selected transmission/ receive mode of a transceiver. Accordingly, the fast mode-transitioning power converter 200 is operable to supply operating power in accordance with standards associated with a particular operating mode.

The mode signal generator 210 is coupled to the mode controller 220. The mode controller 220 is (for example) operable to control timing of transitions and to buffer control signals. The optional current sensor 230 is operable to measure an operating load current. The mode signal generator 210 is optionally responsive to the sensor 228 (e.g., operable to select an operating mode in response to an operating current load). The sensor 228 includes a current sensor 230 and a zero crossing detector 232, both of which provide control information used to control switches of the power output stage 260, for example.

More particularly, the PFM controller 240 comprises a PFM controller 245, a switch 247, and a logic unit 249, which drives the power stage 260. In the PFM controller 240, the PFM controller 245 is coupled to a voltage reference Vref and the voltage output Vout, and to the switch 247 which controls the connection of the PFM controller 245 to the logic unit 249 that drives the power stage 260. The PWM controller 255 is coupled to a voltage reference Vref and to the switch 251, which controls the connection of the PWM controller 255 to the voltage output Vout. The mode controller 220 is coupled to the switch 247 of the PFM controller 240. For example, when the fast mode-transitioning power converter 200 is operating in a PFM mode, the switch 247 is operable to selectively couple the output of the PFM controller 245 to the input of the logic unit 249.

Similarly, the PWM controller 250 comprises a switch 251, a switch 253, a PWM controller 255, a switch 257, a switch 258, and a logic unit 259 that drives the auxiliary power stage 270. The PWM controller 255 is also coupled to the switch 253, which controls the connection of the PWM controller 255 to the auxiliary output voltage Vaux. The PWM controller 255 is also coupled to the switch 257, which controls the connection of the PWM controller 255 to the logic unit 249 of the PFM controller 240. The PWM controller 255 is also coupled to the switch 258, which controls the connection of the PWM controller 255 to the logic unit 259. The mode controller 220 is coupled to the switches 251, 253, 257, and 258 of the PWM controller 250.

For example, the switch 251 is operable to selectively couple the voltage output Vout to an input of the PWM controller 255 when the fast mode-transitioning power converter 200 is operating in a PWM mode. The switch 257 is operable to selectively couple the output of the PWM controller 255 to the input of the logic unit 249 that drives the power stage 260. To increase the speed of transitioning to the PWM mode, the switch 258 is operable to selectively couple the output of the PWM controller 255 to the input of the logic unit 259 (which in turn activates the auxiliary voltage source 270) before entering the PWM mode. The switch 253 is closed (while the switch 251 is open), which couples the Vaux signal (generated by the auxiliary voltage generator 270) to the input of the PWM controller 255. Coupling the Vaux signal to the PWM controller before entering the PWM mode (e.g., while operating in a quiescent mode or a PFM mode) initiates stabilization of the PWM controller 250 control loop without (for example) substantially interrupting the existing operating mode of the fast mode-transitioning power converter 250.

The power output stage 260 includes a power FET switch 265. The power FET switch 265 is operable to selectively couple a voltage source to a first terminal an energy storage element such as inductor L. A second terminal of the inductor L is coupled to the high side of capacitor C and to the output voltage node Vout. A load is optionally coupled to the node Vout and optionally comprises the current sensor 230. The power switch 265 is driven in response to outputs of the logic unit 249.

The auxiliary voltage output stage 270 includes a FET switch 275. The power FET switch 275 is operable to selectively couple a voltage source to an input terminal of a network that is operable to emulate the frequency response of passive components present in the output power stage 260. For example, the 'LC' frequency response is emulated when controlling a buck converter. The passive network includes a first resistor R1 and a second resistor R2. A first capacitor C1 is coupled between a center node of the resistor network (e.g., between R1 and R2) and ground. A second capacitor C2 is coupled between an output terminal of the resistor network and ground. The output terminal of C2 provides the auxiliary voltage output Vaux. The components R1, R2, C1, and C2 are formed (for example) on the same substrate as the PWM controller 250 (and the PFM controller 240) and are selected such that the loop of the PWM controller 250 that includes the feedback signal Vaux is stable. The power switch 275 is driven in response to outputs of the logic unit 259 of the PWM controller 250 such that the supply voltage is converted to Vaux. When not in use, the power switch 275 is optionally placed in an open state such that the supply voltage is not coupled to the center node of the voltage divider and, accordingly, power consumption is reduced.

In operation, the mode signal generator 210 and the optional current sensor 230 provide input signals to the mode controller 220, which actuates (e.g., opens and closes) the switches of the PFM controller 240 and the PWM controller 250 in response to the input signals. To operate in a PFM mode (PFM-only mode, for example), the mode controller 220 signals the switch 247 of the PFM controller 240 to close (e.g., while other switches of the PWM controller 250 remain open). Accordingly, the logic unit 249 of the PFM controller 240 is operable to control the output voltage Vout in response to PFM mode signals generated by the PFM controller 245.

To facilitate a fast transition from operating in the PFM mode to the PWM mode, an auxiliary PWM mode is disclosed in which a PWM mode is operated in parallel with PFM mode. To enter the auxiliary PWM mode, the mode controller 220 signals the switches 253 and 258 of the PWM controller 250 to close. When the switches 253 and 258 are closed (and the switch 251 and 257 are open), the PWM controller 255 is arranged to compare the auxiliary voltage Vaux with (e.g., against) the voltage of Vref and, in response, generates control signals for regulating the auxiliary voltage Vaux (which is output by the auxiliary voltage output stage 270). Operating in the auxiliary PWM mode (in which the auxiliary voltage output stage 270 is operating) consumes substantially less power than the power output stage 260 would otherwise consume when continuing to operate in the PWM mode of operation. The reduction in power consumption results in, for example, increased operating times in restricted-power consumption applications (e.g., such as when operating from battery power).

To transition from operating in the PFM mode to operating in a (e.g., standard) PWM mode, the mode controller 220 signals the switches 251 and 257 of the PWM controller 250 to close (and switch 253 and 258 are opened). The voltage of Vaux is typically selected to be the same voltage as the nominal voltage of Vout such that the operating points of the PWM controller 250 settle to same values in both the cases: (a) when switches 253 and 258 are closed and switches 251 and 257 are open; and (b) when switches 253 and 258 are open and switches 251 and 257 are closed. The operating points in the just mentioned cases may differ slightly due to mismatch in the formation of on-chip components. Having similar operating points, for example, facilitates fast transitioning between operating modes. When the switches 251 and 257 are closed, the PWM controller 255 is arranged to compare the output voltage Vout against the voltage of Vref and, in response, generates control signals for regulating the output voltage Vout.

When the mode controller 220 causes switches 251 and 257 of the PWM controller 250 to close, the mode controller 220 opens the switch 247 (e.g., sometime shortly thereafter) of the PFM controller 240, which transfers the control of the power output stage 260 to PWM controller 250. After the PFM-to-PWM transition is complete, the auxiliary PWM mode is (e.g., optionally) disengaged by the mode controller 220 signaling the switches 253 and 258 to open (and the auxiliary voltage source 270 shut down). When the input to the mode controller 220 from the mode signal generator 210 indicates that the fast mode-transitioning power converter 200 is to transition from operating in a PWM mode back to operating in a PFM mode, the mode controller 220 signals the switch 247 to close, and (e.g., at approximately the same time) signals the switches 251 and 257 to open.

Figure 3:
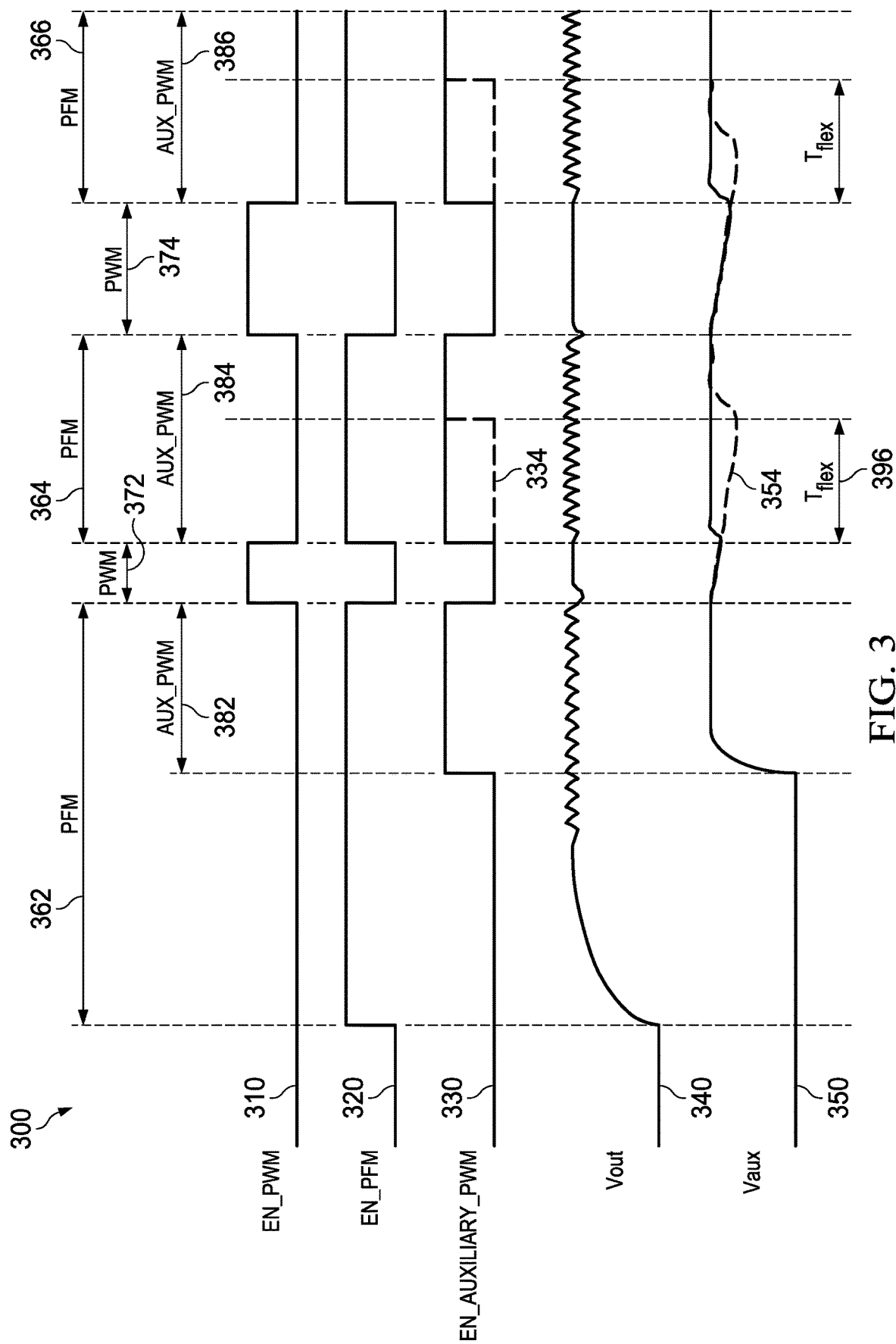
FIG. 3 is a waveform diagram illustrating switching waveforms and output voltages of a fast mode-transitioning power converter in accordance with example embodiments of the disclosure.

FIG. 3 is a waveform diagram illustrating switching waveforms and output voltages of a fast mode-transitioning power converter in accordance with example embodiments of the disclosure. Generally described, waveform diagram 300 illustrates changes in voltages and state over time of various signals of a fast mode-transitioning power converter. Waveform diagram 300 includes an enable PFM signal (EN_PFM) 320, an enable PWM signal (EN_PWM) 310, an enable auxiliary PWM signal (EN_AUXILIARY_PWM) 330, an output voltage (Vout) 340, and an auxiliary voltage (Vaux) 350. The enable signals EN_PFM 320, EN_PWM 310, and EN_AUXILIARY_PWM 330 represent digital signals such as those generated by the mode signal generator 210 of the fast mode-transitioning power converter 200 illustrated in FIG. 2.

A low voltage for each of EN_PFM 320, EN_PWM 310, and EN_AUXILIARY_PWM 330 represents an "off" state, and a high voltage represents an "on" state. Vertical lines in the waveform diagram 300 demarcate particular periods of time, which occur during operation of the fast mode-transitioning power converter 138 and/or the fast mode-transitioning power converter 200.

The output voltage (Vout) 340 and the auxiliary voltage (Vaux) 350 represent the magnitude of these voltages over time as produced by the power output stage 260 and the auxiliary voltage output stage 270, respectively, illustrated in FIG. 2. The power output stage 260 is enabled by a positive transition of EN_PFM 320 such that the power output stage 260 begins to generate an output voltage (Vout). Vout 340 rises during an initial portion of the PFM mode 362 and fluctuates between a lower threshold voltage and a higher threshold voltage when regulation is achieved by the PFM controller 240 during a later portion of PFM mode 362.

In anticipation of entering a PWM mode (such as determined by a transceiver controller, for example), the EN-AUXILIARY-PWM 330 is asserted and the auxiliary PWM mode (e.g., AUX-PWM period 382) is entered. When the EN-AUXILIARY-PWM 330 is asserted, Vaux 350 rises to a voltage that is approximately equal to the target voltage of Vout 340. Regulation is achieved by PWM controller 250 when Vaux 350 rises to the approximately equal target voltage.

After regulation is achieved by PWM controller 250 (or after a sufficient length of time, for example) during the auxiliary PWM mode, EN_PFM 320 is deasserted (e.g., negated) and EN_PWM 310 is asserted. At (e.g., around) this time, the PWM controller 250 (using Vaux 350 as a reference) is used to regulate the power output stage 260. Accordingly, the operation (e.g., achieving feedback stability) of the PWM controller 250 is bootstrapped without, for example, being (e.g., yet) coupled to regulate the voltage Vout 340.

The PWM mode (e.g., PWM period 372) is entered (and the auxiliary PWM mode exited) around the time when the EN_AUXILIARY_PWM 330 is deasserted When the EN_AUXILIARY_PWM 330 is deasserted, the PWM controller 250 regulates the power output stage 260 using the (e.g., selectively coupled) Vout 340 as a reference. In an embodiment, the signal Vaux 350 is decoupled from an input of the PWM controller 255 at this time such that the auxiliary voltage output stage 270 is no longer regulated, and accordingly Vaux 350 begins to drop.

In anticipation of exiting a PWM mode (such as determined by a transceiver controller, for example), the EN_PWM 310 is deasserted and the PFM mode (e.g., PFM period 364) is entered. When the EN_PWM 310 is deasserted, EN_PFM 320 is asserted such that the PFM mode is entered as described above. Signal EN_AUXILIARY_PWM is optionally asserted at this time or asserted after time Tflex (time flex) 396 (e.g., to reduce power consumption over time Tflex 396). Regulation is achieved by PFM controller 240 when Vout 340 fluctuates between two threshold voltages.

In anticipation of entering the next PWM mode, an auxiliary PWM mode is used to bootstrap the PWM controller 259 as described above. Turning the PWM controller off when not (e.g., necessarily) needed (such as during a PFM mode) saves power, but requires additional time to bootstrap the PWM controller 250 when reactivating the PWM controller 250. Accordingly, using the auxiliary PWM mode to bootstrap the PWM controller 250 reduces the amount of time otherwise required to bootstrap the PWM controller 250 and reduces overall power consumption of the system by providing fast mode transitions.

Accordingly, PFM time periods 362, 364, and 366 are periods when the enable signal EN_PFM 320 is on such that the fast mode-transitioning power converter 138 is operating in a PFM mode. PWM time periods 372 and 374 are periods when the enable signal EN_PWM 310 is enabled and the fast mode-transitioning power converter 138 is operating in a PWM mode. AUX_PWM time periods 382, 384, and 386 are periods when the enable signal EN_AUXILIARY_PWM 330 is enabled and the fast mode-transitioning power converter 138 is operating in an auxiliary PWM mode, often at the same time that the fast mode-transitioning power converter 138 is operating in PFM mode.

Accordingly, the auxiliary voltage Vaux 350 provided by the auxiliary voltage output stage 270 (illustrated in FIG. 2) is operable to provide rapid power settling of Vout 340 during the transition from operation of the fast mode-transitioning power converter 138 in a PFM mode to operation in a PWM mode.

The Tflex (flexible time) time period 396 is a time period in which the enable signal EN_AUXILIARY_PWM 330 optionally remains off for a longer time (e.g., as shown by the portion 334 of EN_AUXILIARY_PWM 330) after the assertion on EN-PFM 320 in the first portion of PFM 364. The portion 354 of the auxiliary voltage (Vaux) waveform represents the lower level of auxiliary voltage (Vaux) that is achieved by the auxiliary voltage output stage 270 (illustrated in FIG. 2) when the enable signal EN_AUXILIARY_PWM optionally remains off for the time period 396.

Figure 4:
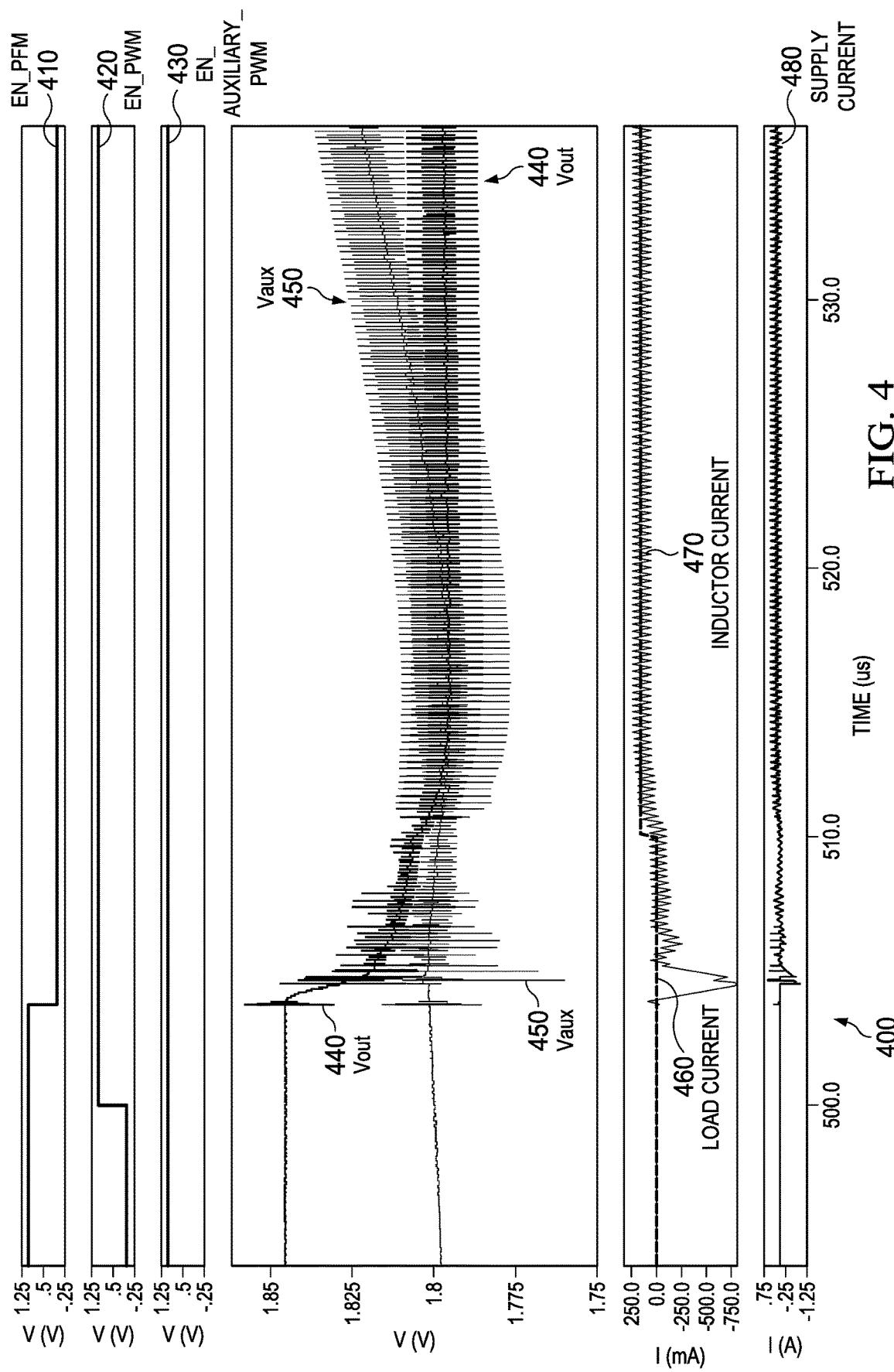
FIG. 4 is a waveform simulation illustrating switching waveforms, output voltages, and currents of a fast mode-transitioning power converter in accordance with example embodiments of the disclosure.

FIG. 4 is a waveform simulation illustrating switching waveforms, output voltages, and currents of a fast mode-transitioning power converter in accordance with example embodiments of the disclosure. Generally described, waveform diagram 400 illustrates waveforms of an enable PFM signal (EN_PFM) 410, an enable PWM signal (EN_PWM) 420, an enable auxiliary PWM signal (EN_AUXILIARY_PWM) 430, an output voltage (Vout) 440, an auxiliary voltage (Vaux) 450, a load current 460, an inductor current 470, and a supply current 480.

Waveform diagram 400 illustrates simulation results of the output voltages and measurements of the internal current of the fast mode-transitioning power converter 138 in response to a transition from operation in the PFM mode to the PWM mode. The (EN_AUXILIARY_PWM) 430 signal represents the operation the Vaux 450 regulation control signal during the auxiliary PWM mode. Initially, the enable PFM signal (EN_PFM) 410 is asserted at the start of the simulation. At a time corresponding to approximately 500.0 microseconds, the enable PWM signal (EN_PWM) 420 is asserted. At approximately 504.0 microseconds ("the PFM-to-PWM transition time point"), the enable PFM signal (EN_PFM) 410 is deasserted such that the fast mode-transitioning power converter transitions from PFM mode to PWM mode. At the PFM-to-PWM transition time point, a momentary lack of regulation (e.g., by using Vout, rather than Vaux, as the feedback signal) causes spikes in both the output voltage (Vout) 440 and the auxiliary voltage (Vaux) 450. The extent of the spikes reduces as the feedback loop stabilizes and the now-regulated voltages both settle into a consistent PWM mode pattern (e.g., in a relatively short period of time) at approximately 511.0 microseconds. The output voltage (Vout) 440 is regulated (e.g., by using Vout as the feedback signal) to maintain a voltage around 1.8 volts from approximately 511.0 microseconds onwards (over which time the auxiliary voltage Vaux 450 rises, for example, due to lack of regulation while still being switched).

Similarly, the inductor current 470 (for example, as present in inductor L of the power output stage 260 illustrated in FIG. 2) starts flowing at the PFM-to-PWM transition time point and settles into a consistent PWM mode pattern by approximately 511.0 microseconds (e.g., even with the increase in the load current 460 that occurs at approximately 510.0 microseconds).

The supply current 480 is sourced by the inductor current 470. A small spike in the supply current 480 occurs at the PFM-to-PWM transition time point and settles by approximately 511.0 microseconds. Accordingly, the presence of the auxiliary voltage (Vaux) 450, as produced by the auxiliary voltage output stage 270 for example, in response to the enable auxiliary PWM signal (EN_AUXILIARY_PWM) 430, allows the fast mode-transitioning power converter 138 to rapidly transition from PFM mode to PWM mode with power settling occurring within approximately 7 microseconds. Accordingly, the output voltage of the output voltage stage is regulated within a time that is less than around 8 microseconds after the start of the second period of time (e.g., wherein the output voltage is regulated at a variance that is around less than 1 percent in the power generated by the power output stage).

Figure 5:
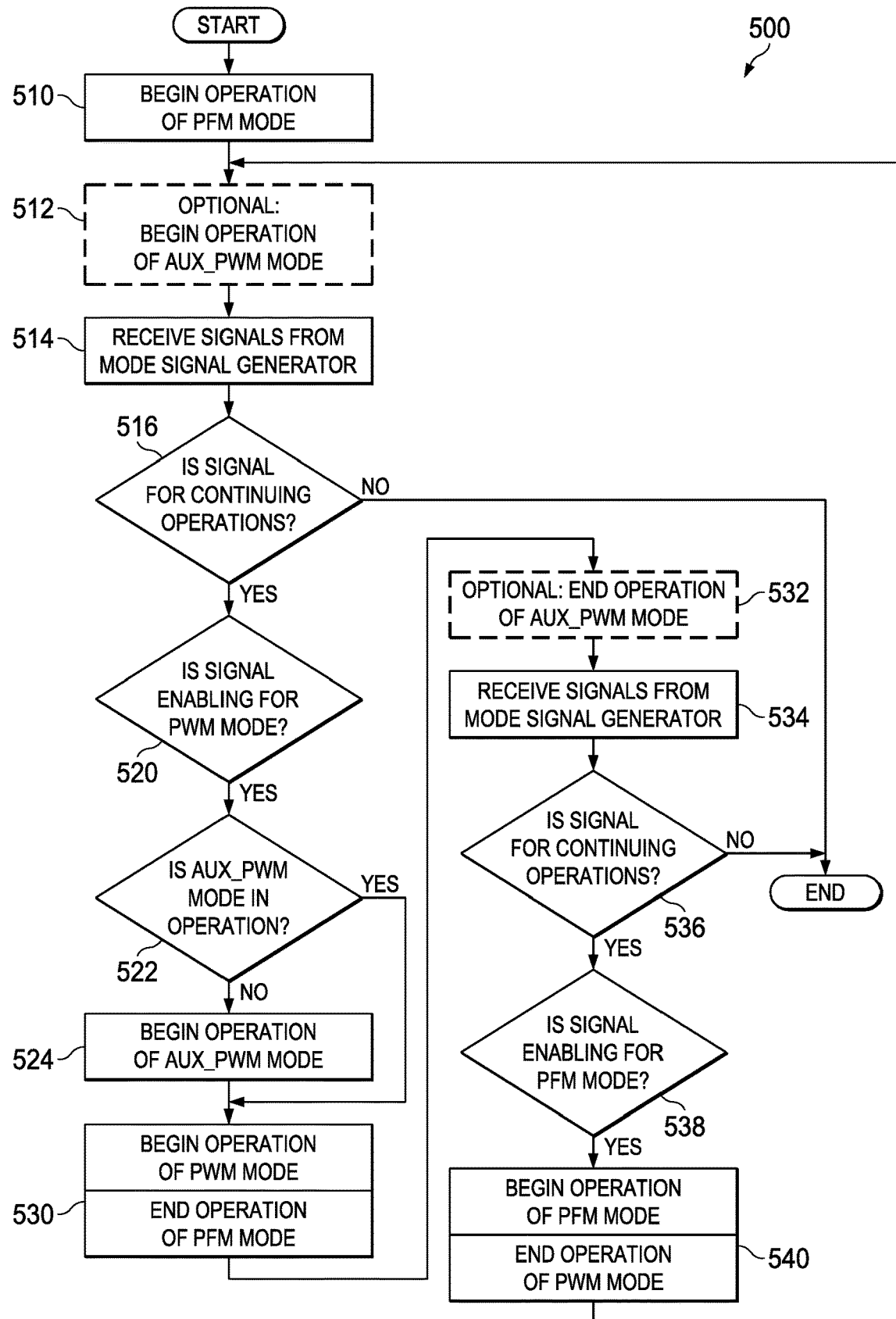
FIG. 5 is a flow diagram of the operation of a fast mode-transitioning power converter in accordance with example embodiments of the disclosure.

FIG. 5 is a flow diagram illustrating a method of operation of a power converter with an auxiliary voltage output stage in accordance with example embodiments of the disclosure. Program flow 500 begins in operation 510, in which the power converter with an auxiliary voltage output stage begins operating in a PFM mode. Program flow continues to operation 512.

In operation 512, the auxiliary voltage output stage of a power converter (optionally) begins operating in preparation for a potential transition to PWM mode. Such preparation includes applying power to unpowered portions of circuitry in the auxiliary voltage output stage. In various embodiments (e.g., such as in applications where the rate of power consumption is not currently a limiting factor), the auxiliary voltage output stage of a power converter remains powered up in a "warm" state. During the warm state, not all power is removed from the auxiliary voltage output stage (e.g., which reduces latency when switching between the PFM and the PWM modes. Program flow proceeds to operation 514.

In operation 514, the mode controller of the auxiliary voltage output stage receives signals from the mode signal generator. The signal mode generator generates signals for transitioning to the auxiliary PWM (AUX_PWM) mode. The signals are generated in response to signals from a processor, for example, which provide an indication of an operation mode (e.g., send or receive) of an electronic communications system. The signals from the processor optionally are generated in response to historical transmission patterns (send and receive modes over time represented in data stored in a database, for example) and/or generated in response to the expiration of predetermined timer values. Program flow continues to operation 516.

In operation 516, the mode controller of the power converter with an auxiliary voltage output stage determines whether a signal for continuing operation has been received. If so, program flow continues to operation 520. If not, program flow terminates. Program flow is optionally reinitiated with commencement of program flow at operation 510.

In operation 520, the mode controller of the power converter with an auxiliary voltage output stage determines whether a signal for enabling operation in PWM mode has been received. If so, program flow continues to operation 522. If not, program flow waits (or e.g., restarts by proceeding to operation 510).

In operation 522, the mode controller of the power converter with an auxiliary voltage output stage determines whether the auxiliary PWM (AUX_PWM) mode is in operation. If so, program flow continues to operation 530. If not, program flow proceeds to operation 524.

In operation 524, the power converter with an auxiliary voltage output stage begins operating in auxiliary PWM (AUX_PWM) mode (which, for example, reduces latency of initializing the PWM controller by stabilizing the feedback loop of the PWM controller before the PWM mode is entered. Program flow continues to operation 530.

In operation 530, the power converter with an auxiliary voltage output stage begins operating in PWM mode, and at the same time or shortly thereafter, the power converter with an auxiliary voltage output stage ceases operating in PFM mode. Program flow continues to operation 532.

In operation 532, the power converter with an auxiliary voltage output stage optionally ceases operating in auxiliary PWM (AUX_PWM) mode in response to signals from a processor. Ceasing operation of the auxiliary PWM mode, for example, saves power otherwise used to power components used in the AUX_PWM mode. Program flow proceeds to operation 534.

In operation 534, the mode controller of the power converter with an auxiliary voltage output stage receives signals from the mode signal generator. Program flow continues to operation 536.

In operation 536, the mode controller of the power converter with an auxiliary voltage output stage determines whether a signal for continuing operation has been received. If so, program flow continues to operation 538. If not, program flow terminates. Program flow may optionally be reinitiated (e.g., restarted) with recommencement of program flow at operation 510.

In operation 538, the mode controller of the power converter with an auxiliary voltage output stage determines whether a signal enabling for operation in PFM mode has been received. If so, program flow continues to operation 540. If not, program flow proceeds to operation 534.

In operation 540, the power converter with an auxiliary voltage output stage begins operating in PFM mode, and at the same time or shortly thereafter, the power converter with an auxiliary voltage output stage ceases operating in PWM mode. Program flow continues to operation 512.

In various embodiments, the above-described components can be implemented in hardware or software, internally or externally, and share functionality with other modules and components as illustrated herein.

The various embodiments described above are provided by way of illustration only and should not be construed to limit the claims attached hereto. Those skilled in the art will readily recognize various modifications and changes that could be made without following the example embodiments and applications illustrated and described herein, and without departing from the true spirit and scope of the following claims.

What is claimed is:

1. A converter comprising:
   a power output stage configured to generate a first voltage output;
   an auxiliary power output stage configured to generate a second voltage output;
   a pulse frequency modulation (PFM) controller configured to control the power output stage in response to the first voltage output generated by the power output stage during a first period of time in which the power output stage operates in a PFM mode; and
   a pulse width modulation (PWM) controller configured to control the auxiliary power output stage in response to the second voltage output generated by the auxiliary power output stage during a second period of time in which the auxiliary power output stage operates in a PWM mode;
   wherein the first period of time includes a first portion that does not overlap with the second period of time and a second portion that overlaps with the second period of time, the first portion occurring before the second portion.

2. The converter as claimed in claim 1, wherein the PWM controller is configured to control the power output stage in response to the first voltage output generated by the power output stage during a third period of time in which the power output stage operates in the PWM mode, wherein the third period of time is not concurrent with either of the first or second periods of time.

3. The converter as claimed in claim 2, wherein the third period of time begins after the first period of time.

4. The converter as claimed in claim 3, wherein the first period of time and the second period time complete at substantially the same time.

5. The converter as claimed in claim 4, wherein the second period of time begins after the first period of time begins.

6. The converter as claimed in claim 2, wherein the PWM controller controls the power output stage and the auxiliary power output stage in response to a feedback signal, wherein the feedback signal is based on the second voltage output during the second period of time and is based on the first voltage output during the third period of time.

7. The converter as claimed in claim 2, wherein the first period of time begins after third period of time.

8. The converter of claim 1, wherein:
during the first period of time, the first voltage output rises during an initial portion and repeatedly fluctuates between a first voltage level and a second voltage level during a regulation portion;
the first portion of the first period of time includes the initial portion; and
the second portion of the first period of time includes only the regulation portion.

9. The converter of claim 8, wherein the first portion of the first period of time includes a portion of the regulation portion.

10. A method comprising:
controlling a power output stage in a pulse frequency modulation (PFM) mode during a first period of time; and
controlling an auxiliary power output stage in a pulse width modulation (PWM) mode during a second period of time;
wherein the first period of time includes a first portion that does not overlap with the second period of time and a second portion that overlaps with the second period of time, the first portion occurring before the second portion.

11. The method as claimed in claim 10, comprising controlling the power output stage in the PWM mode during a third period of time does not overlap with either of the first or second periods of time.

12. The method as claimed in claim 11, wherein the third period of time occurs after the first period of time.

13. The method as claimed in claim 12, wherein the first period of time and the second period of time complete at substantially the same time.

14. The method as claimed in claim 13, wherein the first period of time and the second period of time begin at different times.

15. A system comprising:
an input/output (I/O) port to send data in a transmit mode and to receive data in a receive mode; and
a power converter to supply power to the I/O port, the power converter including:
a power output stage configured to generate a first voltage output;
an auxiliary power output stage configured to generate a second voltage output;
a pulse frequency modulation (PFM) controller configured to control the power output stage in response to the first voltage output generated by the power output stage during a first period of time in which the power output stage operates in a PFM mode; and
a pulse width modulation (PWM) controller configured to control the auxiliary power output stage in response to the second voltage output generated by the auxiliary power output stage during a second period of time in which the auxiliary power output stage operates in a PWM mode;
wherein the first period of time includes a first portion that does not overlap with the second period of time and a second portion that overlaps with the second period of time, the first portion occurring before the second portion.

16. The system as claimed in claim 15, wherein the PWM controller is configured to control the power output stage in response to the first voltage output generated by the power output stage during a third period of time in which the power output stage operates in the PWM mode, wherein the third period of time does not overlap with either of the first or second periods of time.

17. The system as claimed in claim 15, wherein:
during the first period of time, the first voltage output rises during an initial portion and repeatedly fluctuates between a first voltage level and a second voltage level during a regulation portion;
the first portion of the first period of time includes the initial portion; and
the second portion of the first period of time includes only the regulation portion.

18. The system as claimed in claim 17, wherein the first portion of the first period of time includes a portion of the regulation portion.

* * * * *